No. 808,731. PATENTED JAN. 2, 1906.
P. F. DENNING.
CLAMP.
APPLICATION FILED OCT. 18, 1904.
2 SHEETS—SHEET 1.
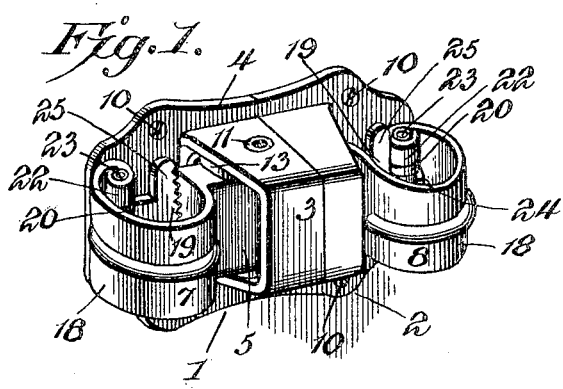
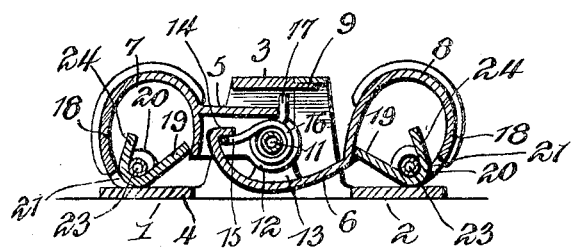
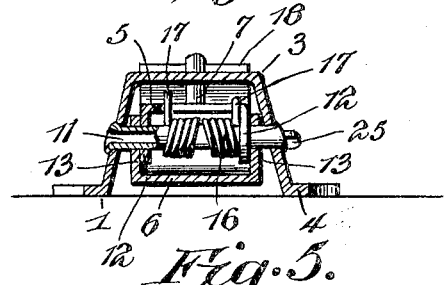
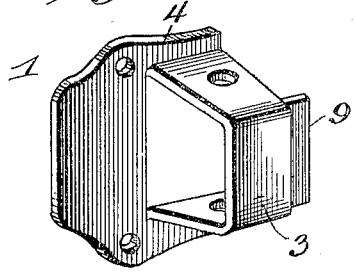
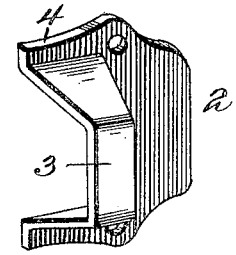
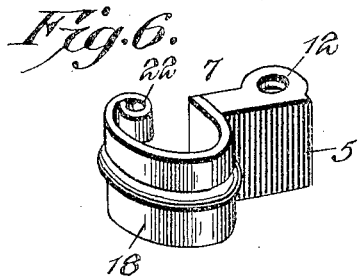
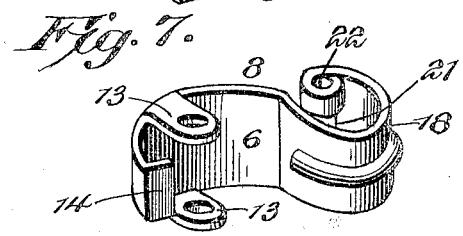
Witnesses
Howard D. Orr
N. F. Riley
Patrick F. Denning, Inventor,
By C. G. Siggers,
Attorney No. 808,731.  
PATENTED JAN. 2, 1906.  
P. F. DENNING.  
CLAMP.  
APPLICATION FILED OCT. 18, 1904.  
2 SHEETS—SHEET 2.
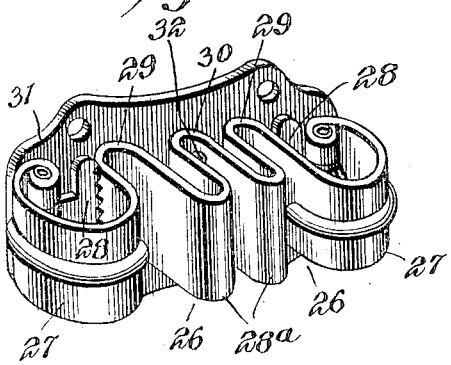
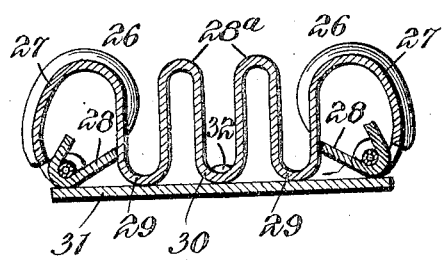
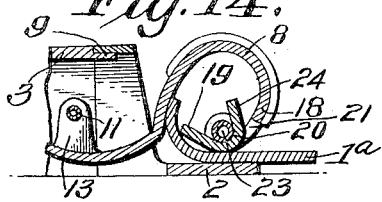
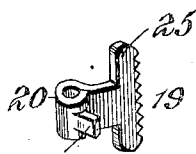
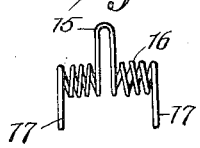
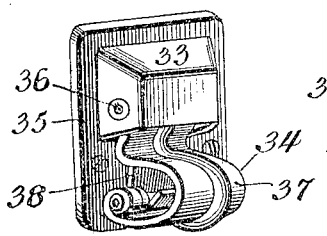
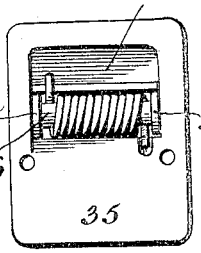
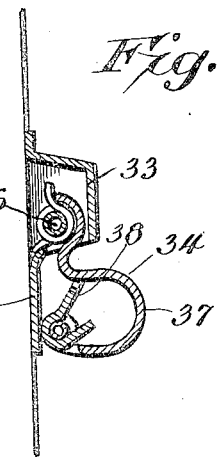
Patrick F. Denning, Inventor,
Witnesses

UNITED STATES PATENT OFFICE.

PATRICK F. DENNING, OF NEWARK, NEW JERSEY.

CLAMP.

No. 808,731. Specification of Letters Patent. Patented Jan. 2, 1906.

Application filed October 18, 1904. Serial No. 229,000.

*To all whom it may concern:*

Be it known that I, PATRICK F. DENNING, a citizen of the United States, residing at Newark, in the county of Essex and State of New Jersey, have invented a new and useful Clamp, of which the following is a specification.

The invention relates to improvements in clamps.

The object of the present invention is to improve the construction of clamps and to provide a simple, inexpensive, and efficient device of great strength and durability designed for holding various articles—such as towels, lace curtains, conductors' checks, and the like—and adapted to enable such articles to be readily placed in the clamp or holder and removed therefrom.

A further object of the invention is to provide a clamp or holder of this character provided with means for positively gripping an article and capable of firmly clamping the same independently of such gripping mechanism, whereby the article is prevented from being torn by such gripping mechanism.

With these and other objects in view the invention consists in the construction and novel combination and arrangement of parts, hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a perspective view of a clamp or holder constructed in accordance with this invention and designed for use on a train for holding conductors' checks. Fig. 2 is a longitudinal sectional view of the same. Fig. 3 is a transverse sectional view. Figs. 4 and 5 are detail views of the sections of the casing. Figs. 6 and 7 are detail views of the movable clamping-jaws. Fig. 8 is a detail view of the hinged dog which constitutes the gripping device. Fig. 9 is a perspective view of a clamp, also designed for holding conductors' checks, and illustrating a modification of the invention. Fig. 10 is a longitudinal sectional view of the same. Fig. 11 is a perspective view illustrating another modification of the invention and showing a clamp designed for holding a towel, lace curtain, &c. Fig. 12 is a vertical sectional view of the same. Fig. 13 is a rear elevation of the clamp shown in Fig. 11. Fig. 14 is an enlarged detail sectional view of one end of the clamp shown in Fig. 2, illustrating the manner of clamping the check. Fig. 15 is a detail view of the coiled spring shown in Figs. 1 and 2.

Like numerals of reference designate corresponding parts in all the figures of the drawings.

1 and 2 designate sections of a transversely-divided casing, which consists of a central projecting housing 3 and an attachment-plate 4. The housing 3 is composed of two sides and a connecting outer transverse portion and is open at the ends to receive the shanks 5 and 6 of a pair of movable spring-actuated jaws 7 and 8, which are adapted to yieldably engage the article held. One of the sections of the casing is provided at the housing with a projecting flange 9, adapted to fit within the other section of the casing, whereby when the casing is secured in position the sections will be firmly interlocked. The attachment-plate is provided with a plurality of perforations for the reception of screws 10 or other suitable fastening device for securing the clamp in position. The attachment-plate extends longitudinally of the device beyond the open ends of the housing for coöperating with the movable jaws, which are mounted within the housing on a single pivot 11. The pivot is preferably tubular, as shown, and the jaw 7 is provided at its shanks with side flanges enlarged and perforated to form ears 12 to receive the pivot. The shank 6 of the other jaw 8 extends beneath the shank 5 and between the side flanges thereof and is provided with projecting ears 13 for the reception of the said pivot 11. The ears 13 are located at a point between the ends of the shank, and the terminal of the latter is bent inwardly to form a projecting flange 14. The flange 14 is engaged by a central loop 15 of a coiled spring 16. The spring 16, which is disposed on the tubular pivot, is doubled or bent at its center to form the loop 15 and is coiled at opposite sides of the central loop, as clearly shown in Fig. 15, and its terminals 17 engage the end of the shank 5 of the jaw 7. The device is preferably constructed of sheet metal; but any other suitable material may be employed in its construction.

The jaws 7 and 8 are provided with outer clamping portions consisting of approximately oval loops 18, which coöperate with the end portions of the attachment-plate. The coiled spring holds the end portions of the jaws firmly in engagement with the article to be clamped or held. Each loop, which forms an opening to receive a portion of the article to be clamped, is provided with an interiorly-arranged gripping device, consisting of a dog 19, having a serrated or toothed engaging edge and provided at the back with spaced eyes 20, which are arranged in a slot or bifurcation 21 of the jaws, the latter being coiled at opposite sides of the slot or bifurcation to provide eyes 22, which register with the eyes 20 and which receive a pivot 23. The pivot 23 is also preferably tubular, and the metal between the eyes 20 of the dog is bent inwardly at an angle to the body of said dog to form a lug 24. The lug 24 is arranged to abut against the adjacent portion of the loop 18 and forms a stop for limiting the inward swing of the dog.

The device illustrated in Figs. 1 to 8, inclusive, of the drawings is especially designed for holding conductors' checks; but it may be employed for a variety of other purposes. It is designed to be secured in a car or coach between the seats and is adapted to hold two checks, one for each of the occupants of the seat. This will obviate the necessity of inserting such checks beneath the hat-band, as is usually done, and considerable time and labor will be saved. Also injury to hats by turning the band under at the edge will be avoided. The check $1^a$ is introduced into the clamp between the jaw and the attachment-plate, and the inner end of the check is introduced into the loop between the inside of the same and the dog, which positively grips the check and prevents the same from being removed from the clamp by a pull exerted at the outer end of the check. The hinged dog is provided at one side of the device with an extension 25, projecting beyond the loop and adapted to be readily grasped for enabling the dog to be swung out of engagement with a check for releasing the same.

The pivotal spring-actuated jaw yieldably engages a check or other article; but instead of pivoting the jaw and employing a spring for actuating the same the jaw may be constructed of spring metal, as illustrated in Figs. 9 and 10 of the drawings. The jaws 26, which are provided with outer loops 27 and dogs 28, are constructed of a single piece of resilient metal and have inner outwardly-extending approximately U-shaped spring-loops $28^a$, which are connected with the outer loops by curved bends 29 and with each other by a centrally-curved bend 30. The centrally-curved bend is secured to the attachment-plate 31 by a rivet 32 or other suitable fastening device. Any number of bends or loops may be employed at the inner portions of the jaws for providing a spring action of the desired strength. The outer loops 27 and the dogs 28 are constructed the same as those heretofore described. The clamp shown in Figs. 9 and 10 is designed to be used for the same purpose as the clamp shown in Figs. 1 to 8, inclusive. In Figs. 11 to 13 is illustrated another modification of the invention designed for holding towels, lace curtains, and various other articles. This device, which is also adapted for use on railway-coaches, comprises a casing 33 and a pivoted spring-actuated jaw 34. The casing is provided with an attachment-plate 35, which is designed to be secured by screws or other suitable fastening devices to a door or other fixture for holding a towel. The jaw is provided at its shank with suitable ears $35^a$ for the reception of a pivot 36 for securing the jaw within the casing. The outer engaging portion of the jaw is provided with a loop 37, constructed as heretofore described and provided with an interiorly-arranged dog 38, adapted to engage a towel, lace curtain, or the like. The towel or other fabric is also clamped between the loop and the attachment-plate of the casing, whereby it is prevented from being torn by the teeth of the dog.

Having thus fully described my invention, what I claim as new, and desire to secure by Letters Patent, is—

1. A clamp of the class described, having a movable spring-controlled clamping-jaw for yieldably engaging the object to be held, and independently-movable gripping mechanism carried by the clamping-jaw and arranged to clamp the article against the said jaw.

2. A clamp of the class described, provided with a movable clamping-jaw arranged to engage the article to be held, and gripping mechanism movably mounted on and carried by the clamping-jaw and also arranged to clamp the article independently of and simultaneously with the clamping of the same by the said jaw.

3. A clamp of the class described provided with a movable clamping-jaw having an opening and adapted to engage the article to be held, and a gripping device operating within the opening of the jaw and carried by the latter and arranged to clamp the article against the said jaw.

4. A clamp of the class described, provided with a clamping-jaw arranged to engage the article to be held, said clamping-jaw having an opening, and a hinged dog mounted within the opening of the jaw and arranged to grip a portion of the article and clamp the same against the jaw.

5. A clamp of the class described, having a clamping-jaw provided at its engaging portion with a loop, a dog operating within the loop and carried by the same and arranged to clamp an article against the said jaw, and means for limiting the movement of the dog.

6. A clamp of the class described, having a clamping-jaw provided with a loop, said loop being bifurcated and having eyes at opposite sides of the bifurcation, a movable dog arranged within the loop and having an eye, a lug carried by the dog and movable into and out of engagement with the loop, and a pivot passing through the said eyes and hinging the dog to the jaw, the inward movement of the said dog being limited by the said lug.

7. A clamp of the class described, comprising a casing open at opposite ends and provided with a pivot, a pair of clamping-jaws mounted on the pivot and extending from the open ends of the casing, and a spring mounted on the pivot and engaging each of the jaws for holding the same in their engaging positions.

8. A clamp of the class described, comprising a casing open at opposite ends and having a pivot, jaws extending from the open ends of the casing and having shanks extending into the same, said shanks being provided at opposite sides with eyes, one of the shanks being extended beyond one of the eyes and provided at its extended portion with a lug, and a spring mounted on the pivot and having an intermediate portion engaging the lug of one of the shanks, and the ends of the spring being engaged with the other shank.

9. A clamp of the class described, comprising a casing having a housing and an attachment-plate, said casing being divided transversely and having interlocking portions, and movable jaws mounted on the casing and extending from the housing.

10. A clamp of the class described, comprising a casing composed of an attachment-plate and a housing, said casing being divided transversely to form two sections, one of the sections being provided with a flange extending into the other section, and movable jaws mounted within the casing and extending therefrom.

11. A clamp of the class described, comprising a movable jaw arranged to engage the article to be held, and a dog carried by the free portion of the jaw and operating within the same and arranged to engage a portion of the article clamped by the jaw.

12. A clamp of the class described, comprising a movable jaw arranged to engage the article to be held, and a dog carried by the free portion of the jaw and operating within the same and arranged to engage a portion of the article clamped by the jaw, said dog having its free end provided with teeth.

In testimony that I claim the foregoing as my own I have hereto affixed my signature in the presence of two witnesses.

PATRICK F. DENNING.

Witnesses:
J. LEO NICHOLSON,
DANIEL ENGEL.